United States Patent [19]

Gruntfest et al.

[11] 3,937,671

[45] Feb. 10, 1976

[54] METHOD OF RECOVERING CONSTITUENTS FROM POLYESTER AND CELLULOSIC TEXTILE WASTE

[75] Inventors: Irving Gruntfest, Cheltenham, Pa.; Rudolph Turner, Trenton; Ludwig Rebenfeld, Princeton, both of N.J.

[73] Assignee: Textile Research Institute, Princeton, N.J.

[22] Filed: Nov. 18, 1974

[21] Appl. No.: 524,590

[52] U.S. Cl. ................................ 260/2.3; 8/121
[51] Int. Cl.² ........................................ C08J 11/04
[58] Field of Search ................................ 260/2.3

[56] References Cited
UNITED STATES PATENTS

| | | | |
|---|---|---|---|
| 2,498,398 | 2/1950 | Dasher | 260/2.3 X |
| 2,567,802 | 9/1951 | Carr et al. | 260/2.3 X |
| 2,701,268 | 2/1955 | Dasher | 260/2.3 X |

OTHER PUBLICATIONS

Ott, et al. —Text Book Cellulose Part II —4/1955— pp. 778–779.

*Primary Examiner*—Carman J. Seccuro
*Attorney, Agent, or Firm*—Sperry and Zoda

[57] ABSTRACT

Textile wastes composed of blended polyester and cellulose fibers are subjected to the action of glacial acetic acid and acetic anhydride in the presence of a catalyst under conditions which serve to convert the cellulose component of the waste to cellulose acetate which is separated from the unreacted polyester component in the form of a solution adapted to be used in the manufacture of cellulose derivatives whereas the polyester is recovered in a form which may be garnetted to obtain a staple fiber for reuse.

6 Claims, No Drawings

METHOD OF RECOVERING CONSTITUENTS FROM POLYESTER AND CELLULOSIC TEXTILE WASTE

FIELD OF INVENTION

Many millions of pounds of textile wastes are produced every year in the manufacture of clothing and other textile products and have heretofore had very little commercial value. On the other hand the shortage of textile fibers has become acute rendering the recycling and conversion of such wastes into useful products a problem of primary importance. The recovery of useful products from textile wastes composed of blended fibers such as polyester and cotton or rayon presents a particularly difficult problem by reason of the differing properties of the two fibers.

THE PRESENT INVENTION

In accordance with the present invention textile wastes composed of blended polyester and cellulosic fibers, such as cotton or rayon, are subjected to an acetylation reaction under conditions whereby a cellulose acetate derivative is produced which bcomes soluble in the reaction mixture whereas the polyester residue remains substantially unaffected. The cellulose acetate containing solution is then separated from the polyester component of the waste and may be used in the production of films, fibers, and bulk plastic products and in the formation of various cellulose derivatives. The remaining polyester yarns are then left in a relatively open and sheer condition and may be garnetted to obtain a staple fiber product useful in spinning yarns or for bat forming and nonwoven product manufacture.

The acetylation of the cellulosic fiber of the waste may be effected by using a variety of chemical conditions well known in the industry for the acetylation of cellulose. The preferred method employed involves the use of mixtures of acetic anhydride and glacial acetic acid containing a catalyst such as sulfuric or phosphoric acid. The acetylation reaction is accompanied by hydrolysis of the cellulose backbone chain which varies with such factors as reagent concentration, water content, temperature and time. The degree of acetylation achieved is dependent on the water content of the acetylating medium during the final stages of the reaction. The water content is adjusted by the addition of either water or dilute acetic acid as the reaction proceeds.

If it is necessary to remove resinous material prior to the acetylation reaction, then preliminary acid treatment should be carried out as follows: treatment in dilute (5 to 10% by weight) sulfuric acid at 40°–70°C for 10 to 20 minutes. After this treatment, the sulfuric acid is washed out and the material is steeped at room temperature for 10 to 15 minutes in two successive portions of glacial acetic acid. If no resinous material is to be removed from the waste prior to the acetylation treatment, then the following acid pretreatment will be sufficient: treatment in water for 5 to 10 minutes and after pressing out excess water, treatment in two successive portions of glacial acetic acid for 10 to 15 minutes. The acetylation reaction can then proceed.

In order to illustrate a typical procedure in accordance with the present invention the following example is cited.

A blend of 50% polyester and 50% cotton in the form of sheeting having a weight of 4 ounces per square yard is reduced to the form of pieces one inch square. 10 parts by weight of such textile waste are activated for acetylation by treatments with sulfuric acid and finally with glacial acetic acid which also serves to remove any resin or other additives present on the material. The textile waste is then agitated for 5 minutes with 180 parts by weight of glacial acetic acid containing 1% of concentrated (98%) sulfuric acid. 50 parts by weight of acetic anhydride are then added to the mixture and shaken for 2 hours at ambient temperatures. After this reaction 7.5 parts by weight of water and 17.5 parts by weight of glacial acetic acid are added to hydrolyze any sulfate esters that may have been formed.

The cellulose acetate containing solution is separated by filtration from the unreacted polyester component of the waste and the polyester is washed several times with portions of glacial acetic acid in order to remove the cellulose acetate completely from the polyester.

The polyester is then washed with water to remove the remaining acid therefrom and may be garnetted to produce a staple adapted for reuse in the manufacture of spun yarns or in the production of bats for use in nonwoven processes.

The cellulose acetate solution may be used in the production of fibers, films and bulk plastic products. For this purpose water or dilute acetic acid may be added to the solution to precipitate the cellulose acetate in the form of flakes which are separated by filtration or centrifugation and final drying. The cellulose acetate flakes may be used in the production of fibers, films and bulk plastic products and also in the formation of various cellulose derivatives in accordance with conventional practice.

In typical trials involving several types of commercial polyester/cotton fabrics, the cellulose acetate was recovered in yields of approximately 90% with degree of substitution values ranging from 2.1 to 2.5 and degree of polymerizatiion values ranging from 230 to 370. The polyester was recovered in excess of 95% with no apparent damage to fiber properties (before garnetting) as indicated by the following examples.

The mechanical properties of polyester fibers recovered from a 50/50 polyester/cotton blue denim fabric waste after treatment in accordance with the present invention were as follows:

|  | Warp (Blue) | | Filling (White) | |
| --- | --- | --- | --- | --- |
|  | orig. | after | orig. | after |
| Linear Density (denier) | 2.0 | 2.2 | 2.1 | 2.4 |
| Modulus (grams per denier) | 50.3 | 43.0 | 40.4 | 36.7 |
| Extension (%) | 26.4 | 38.7 | 32.9 | 40.0 |
| Tenacity (grams per denier) | 5.57 | 4.91 | 5.06 | 4.71 |
| Break Load (grams) | 10.8 | 10.7 | 10.4 | 10.9 |

The mechanical properties of the polyester fibers obtained from a 50/50 polyester/cotton green percale fabric waste after treatment in accordance with the present invention were as follows:

|  | Warp | | Filling | |
| --- | --- | --- | --- | --- |
|  | orig. | after | orig. | after |
| Linear Density (denier) | 1.67 | 1.72 | 1.56 | 1.50 |
| Modulus (grams | 52.6 | 43.9 | 50.6 | 47.5 |

-continued

|  | Warp orig. | after | Filling orig. | after |
|---|---|---|---|---|
| per denier) Extension (%) | 24.4 | 25.6 | 21.6 | 21.6 |
| Tenacity (grams per denier) | 5.56 | 5.55 | 5.46 | 5.70 |
| Break Load (grams) | 9.20 | 9.49 | 8.45 | 8.37 |

The acetylation step of the process may be carried out in substantially any desired manner using a variety of chemical conditions well known in the industry for the acetylation of cellulose. The particular conditions employed in any operation may be varied as desired depending upon the particular type of textile waste being treated and the equipment available for carrying out the process. In view thereof it should be understood that the specific example cited above is intended to be illustrative only.

We claim:

1. A method of producing useful products from textile wastes containing blended polyester and cellulose fibers which comprises treating such wastes with an aqueous solution of glacial acetic acid and acetic anhydride under conditions which serve to acetylate the cellulose while leaving the polyester substantially unaffected and separating the unreacted polyester fiber from the cellulose acetate composition thereby produced.

2. A method as defined in claim 1 wherein the textile waste is first treated with dilute acid to remove any additives carried by the waste treated.

3. A method as defined in claim 1 wherein the polyester fiber separated from the cellulose acetate produced is thereafter garnetted to form a loose fibrous product.

4. A method as defined in claim 1 wherein the textile waste is treated with dilute acid to activate the cellulose contained in the waste and is thereafter treated with glacial acetic acid and a catalyst followed by agitation in the presence of acetic anhydride, the unreacted polyester is separated from the resulting reaction mixture in which cellulose acetate is dissolved and water is added to the reaction mixture to precipitate the cellulose acetate therefrom.

5. A method as defined in claim 4 wherein the treatment of the textile waste with glacial acetic acid and acetic anhydride is carried out while agitating the mixture at ambient temperature until conversion of the cellulosic component to cellulose acetate is substantially complete and is dissolved in the reaction mixture.

6. A method as defined in claim 5 wherein the precipitated cellulose, acetate is separated from the reaction mixture and utilized to produced other cellulosic products.

* * * * *